April 19, 1932.   J. W. HYER   1,854,586
UNIVERSAL JOINT
Original Filed June 23, 1928   2 Sheets-Sheet 1

Inventor
J. W. Hyer
By Lacey & Lacey, Attorneys

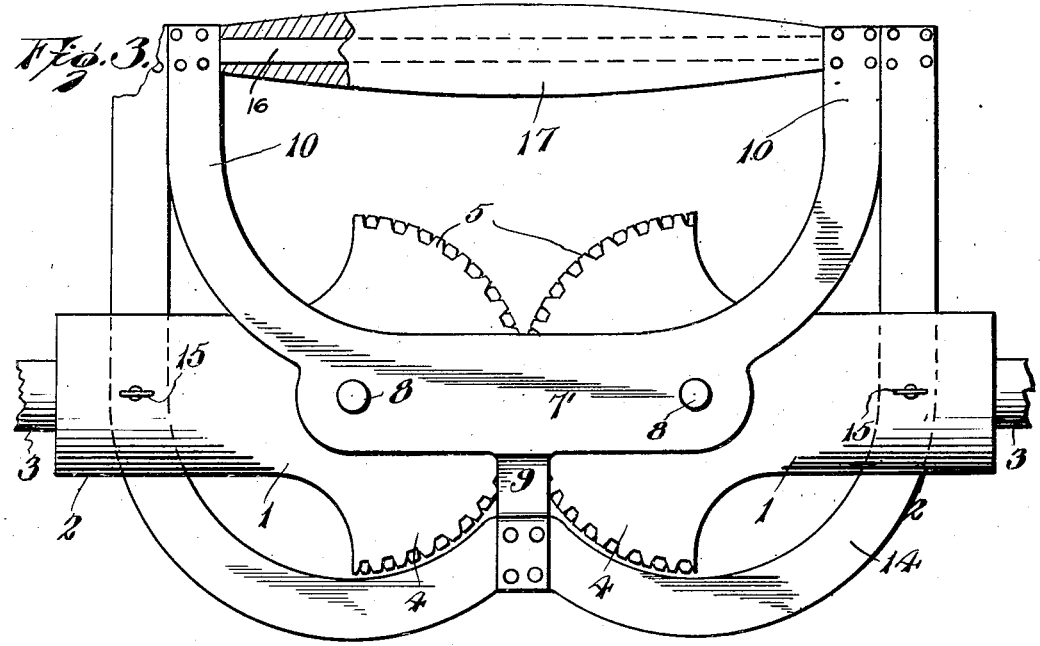
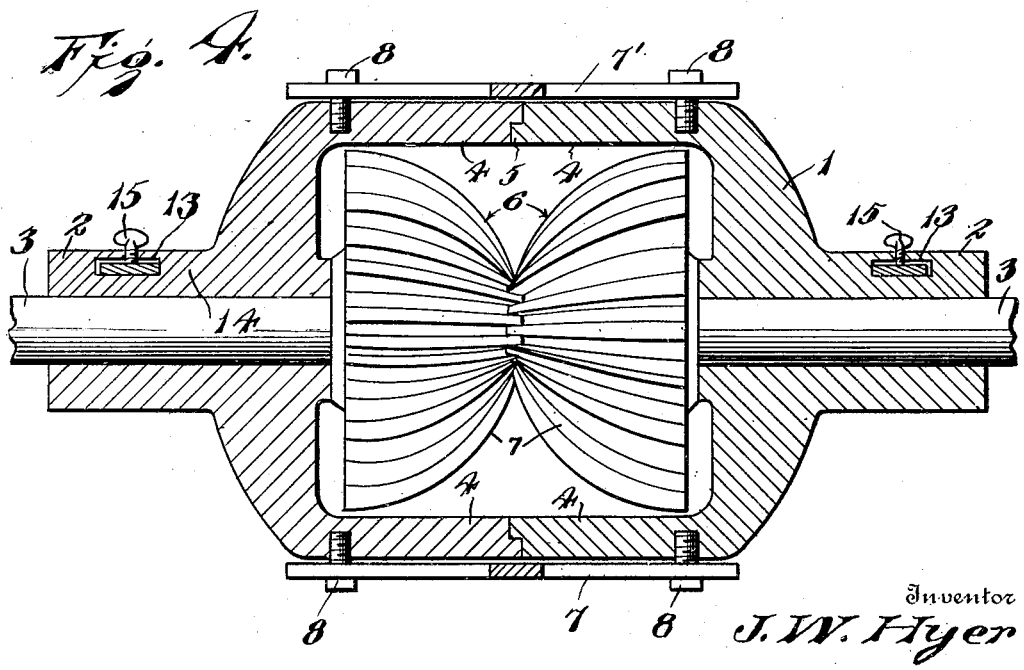

Patented Apr. 19, 1932

1,854,586

UNITED STATES PATENT OFFICE

JOHN W. HYER, OF KIRKWOOD, MISSOURI

UNIVERSAL JOINT

Application filed June 23, 1928, Serial No. 287,681. Renewed May 13, 1931.

The present invention is directed to improvements in universal joints.

The primary object of the invention is to provide a device of this character so constructed that the gears thereof can assume various angles without retarding the movement of the driving and driven shafts.

Another object of the invention is to provide a device of this character having means whereby the gears can be rigidly held in direct alinement or in various angles of adjustment.

Another object of the invention is to provide segmental racks having their teeth staggered in order to prevent lateral movement of the segments when the teeth thereof are in mesh.

Another object of the invention is to provide a device of this character having a hand grip associated therewith in order that the joint can be braced when in operation.

With these and other objects in view, this invention resides in the novel features of construction, formation, combination and arrangement of parts to be hereinafter more fully described, claimed and illustrated in the accompanying drawings, in which:—

Figure 1:
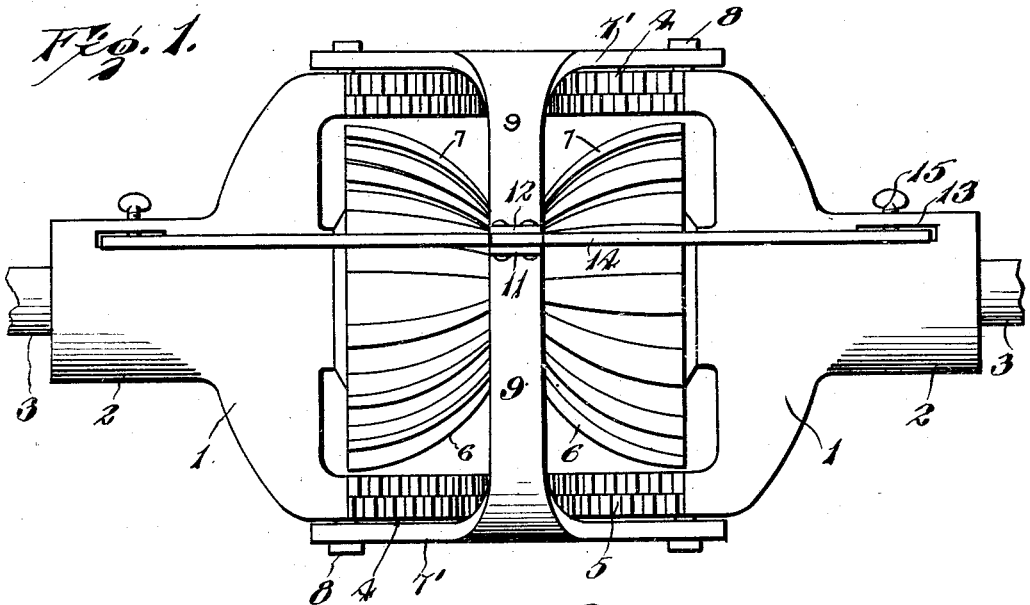
Figure 2:
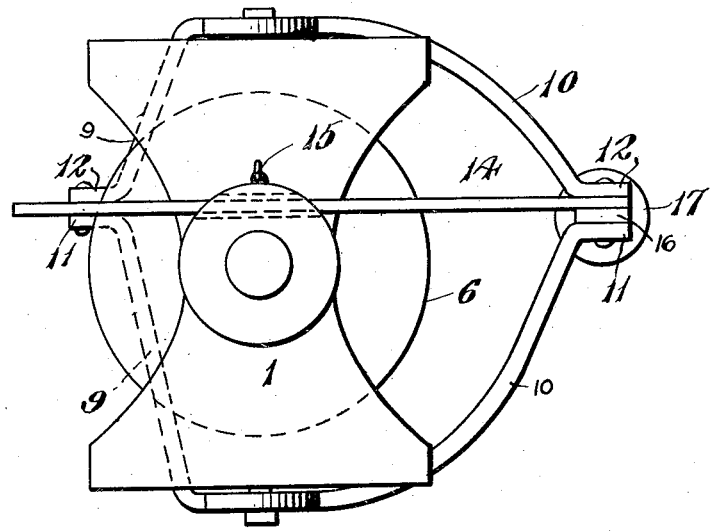

Figure 1 is a side elevation.
Figure 2 is an end view.
Figure 3 is a plan view.
Figure 4 is a longitudinal sectional view.

The device comprises a pair of heads 1 which have formed integral therewith sleeves 2, in which are rotatable the opposed ends of the shafts 3, either one of which may be the driving shaft.

The heads 1 are provided with laterally spaced segmental racks 4, the teeth 5 of each rack being staggered so that when in mesh lateral movement of the racks is prevented, as will be obvious.

Fixed to the inner ends of the shafts 3 are semi-spherical gears 6, the teeth 7 thereof being so arranged that they will mesh not only when the shafts 3 are in direct alignment, but when the shafts are in angular relationship.

In order to hold the gears 6 and segments 4 in mesh plates 7' are provided and have their ends pivotally connected to segments 4 by bolts 8, said plates each having formed integral therewith a single arm 9 and a pair of arms 10 extending in opposite directions, said arms being provided, respectively, upon their terminals with flanges 11 and 12, the purpose of which will be later explained.

The sleeves 2 are provided with transverse slots 13 in which are engaged the arms of the yoke 14, there being set screws 15 carried by the sleeves for engaging the yoke arms to hold the same interlocked with the sleeves when desired.

The terminals of the yoke arms 14 are riveted to the ends of the strap 16, said strap being also riveted between the flanges 11 and 12 of the arms 10, said strap having engaged thereon a hand grip 17. The bight portion of the yoke is riveted between the flanges 11 and 12 of the arms 9.

It will be apparent that when the set screws 15 are in binding engagement with the yoke arms that the heads 1 and gears 6 can be held in alignment or in angular relationship, as desired. When the set screws are released it will be apparent that the joint can flex, at which time the segments 4 can rock upon each other as the gears are rotated.

In some instances it may be desired to brace the joint during its operation, therefor the hand grip 17 has been provided.

It will thus be seen that a joint has been provided which can be used for various purposes, and wherever it is desired to produce an angular adjustment of the driving gears.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

What is claimed is:—

1. A device of the character described comprising a pair of heads having sleeves, segmental racks carried by the heads, intermeshing gears between the racks, plates pivotally connecting the racks, means for driving the gears, a yoke supported by the plates and having its arms slidable in the sleeves and means for interlocking the yoke with the sleeves to hold the gears in various angles of adjustment.

2. A device of the character described comprising a pair of heads having sleeves carried thereby, said sleeves having transverse slots therein, segmental racks carried by the heads and in mesh with each other, shafts journaled in the sleeves and having gears carried by their inner ends, said gears being in mesh between the racks, plates pivotally connecting the racks, said plates having arms, a yoke fixed to certain of the arms and slidable in the slots, means for securing the yoke within the slots, and a hand grip associated with certain other of the arms.

In testimony whereof I affix my signature.

JOHN W. HYER. [L. S.]